(12) United States Patent
Lee

(10) Patent No.: US 8,861,409 B2
(45) Date of Patent: Oct. 14, 2014

(54) APPARATUS AND METHOD FOR AUTOMATIC CHANGING NETWORK IN MOBILE COMMUNICATION TERMINAL

(75) Inventor: Chung-Kyu Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 727 days.

(21) Appl. No.: 12/703,216

(22) Filed: Feb. 10, 2010

(65) Prior Publication Data
US 2010/0202408 A1 Aug. 12, 2010

(30) Foreign Application Priority Data
Feb. 10, 2009 (KR) .................. 10-2009-0010461

(51) Int. Cl.
*H04B 7/00* (2006.01)
*H04W 36/32* (2009.01)
(52) U.S. Cl.
CPC .................................. *H04W 36/32* (2013.01)

USPC ........................................................ 370/310
(58) Field of Classification Search
USPC ............... 455/403, 422.1, 436, 442; 370/310, 370/328, 329, 331
See application file for complete search history.

(56) References Cited

U.S. PATENT DOCUMENTS

| | | | |
|---|---|---|---|
| 8,000,726 B2 * | 8/2011 | Altman et al. | 455/456.3 |
| 8,089,400 B1 * | 1/2012 | Fang et al. | 342/357.42 |
| 2007/0002885 A1 * | 1/2007 | Lee et al. | 370/432 |
| 2008/0279153 A1 * | 11/2008 | Xie et al. | 370/332 |

* cited by examiner

*Primary Examiner* — Fan Ng
(74) *Attorney, Agent, or Firm* — Jefferson IP Law, LLP

(57) ABSTRACT

A method and apparatus for automatically changing a network in a mobile communication terminal are provided. The method includes determining whether the network needs to change, transmitting location information of the terminal to a server when the network needs to change, receiving network information based on the location information from the server, and setting network connection information of the terminal based on the received network information.

15 Claims, 5 Drawing Sheets

APPARATUS AND METHOD FOR AUTOMATIC CHANGING NETWORK IN MOBILE COMMUNICATION TERMINAL

PRIORITY

This application claims the benefit under 35 U.S.C. §119(a) of a Korean patent application filed in the Korean Intellectual Property Office on Feb. 10, 2009 and assigned Serial No. 10-2009-0010461, the entire disclosure of which is hereby incorporated by reference.

BACKGROUND OF THE INVENTION

1. Field of the Invention

Aspects of the present invention relate to an apparatus and method for automatically changing a network in a mobile communication terminal. More particularly, aspects of the present invention relate to an apparatus and method for automatically changing a network on the basis of a location of a mobile communication terminal.

2. Description of the Related Art

The rapid development of wireless network technologies and the wide-spread use of a mobile communication terminal are resulting in a significant increase in the interest in broadcast services using the mobile communication terminal, that is, mobile broadcast services. The mobile broadcast services are defined by various standards, such as Digital Multimedia Broadcasting (DMB), Digital Video Broadcasting-Handheld (DVB-H), Open Mobile Alliance (OMA)-BroadCAST (BCAST), etc. The DVB-H service is a broadcast standard used in Europe, and utilizes different DVB-H connection information according to a service provider.

However, a mobile communication terminal provided in recent years is introduced by setting only network information of a specific service provider, so that a user can use only a network of the specific service provider. Therefore, when the user of the mobile communication terminal moves from a specific country to another country, the user cannot use the mobile broadcast service because the network service provider has changed.

Accordingly, the conventional mobile communication terminal provides a method for allowing a user to directly set network information in order to use a network other than a pre-set network. However, the method in which the user directly sets the network information has a disadvantage in that the user has to know in advance an available network and information on the network based on of a location of the user.

SUMMARY OF THE INVENTION

Aspects of the present invention address at least the above-mentioned problems and/or disadvantages and provide at least the advantages described below. Accordingly, an aspect of the present invention provides an apparatus and a method for automatically changing a network in a mobile communication terminal.

Another aspect of the present invention provides an apparatus and a method for automatically changing a network by setting network information based on a location in a mobile communication terminal.

In accordance with an aspect of the present invention, a method of automatically changing a network in a mobile communication terminal is provided. The method includes determining whether the network needs to change; when the network needs to change, transmitting location information of the terminal to a server; receiving network information based on the location information from the server; and setting network connection information of the terminal based on the received network information.

In accordance with another aspect of the present invention, a method of operating a server for automatically changing a network of a mobile communication terminal is provided. The method includes receiving location information of the terminal, searching for network information corresponding to the location information of the terminal from a pre-stored database, and transmitting the found network information to the terminal.

In accordance with still another aspect of the present invention, an apparatus for automatically changing a network in a mobile communication terminal is provided. The apparatus includes a location information acquisition unit for acquiring location information of the terminal; a controller for determining whether the network needs to change, and when the network needs to change, for transmitting location information of the terminal to a server to receive network information based on the location information from the server; and a network connection setting unit for setting network connection information of the terminal based on the received network information.

In accordance with yet another aspect of the present invention, a server apparatus for automatically changing a network of a mobile communication terminal is provided. The apparatus includes a storage unit for storing network information based on a location; and a controller for providing control so that network information corresponding to location information of the terminal is searched for from the storage unit and is then transmitted to the terminal, upon receiving the location information from the terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An apparatus and for automatically changing a network by setting network information based on a location in a mobile communication terminal will be described hereinafter. Although in the following description the mobile communication terminal acquires location information via a Global Positioning System (GPS), the location information may also be acquired using power of the mobile communication terminal, a radio wave arrival time difference, and a radio wave reception angle of an antenna. Similarly, other global navigation satellite systems can be employed instead of GPS, and thus it should be understood that GPS as used herein may also refer to other global navigation satellite systems.

Figure 1:
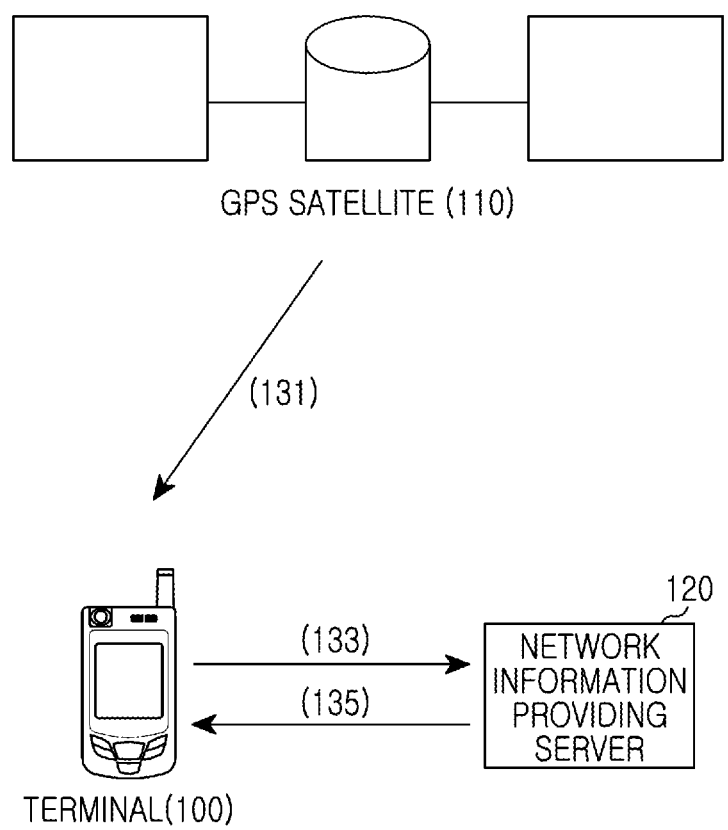
FIG. 1 illustrates a structure of a system for acquiring network information based on a location in a mobile communication terminal according to an exemplary embodiment of the present invention.

FIG. 1 illustrates a structure of a system for acquiring network information based on a location in a mobile communication terminal according to an exemplary embodiment of the present invention. Referring to FIG. 1, a terminal 100 acquires its location information using a GPS satellite 110 in step 131, and transmits the acquired location information to a network information providing server 120 to request provision of the network information in step 133.

The network information providing server 120 searches for the network information corresponding to the location information received from the terminal 100, and transmits the network information to the terminal 100 in step 135. The terminal 100 receives the network information based on the location information of the terminal from the network information providing server 120, and then receives a signal from a corresponding network by setting the received network information as network connection information.

Figure 2:
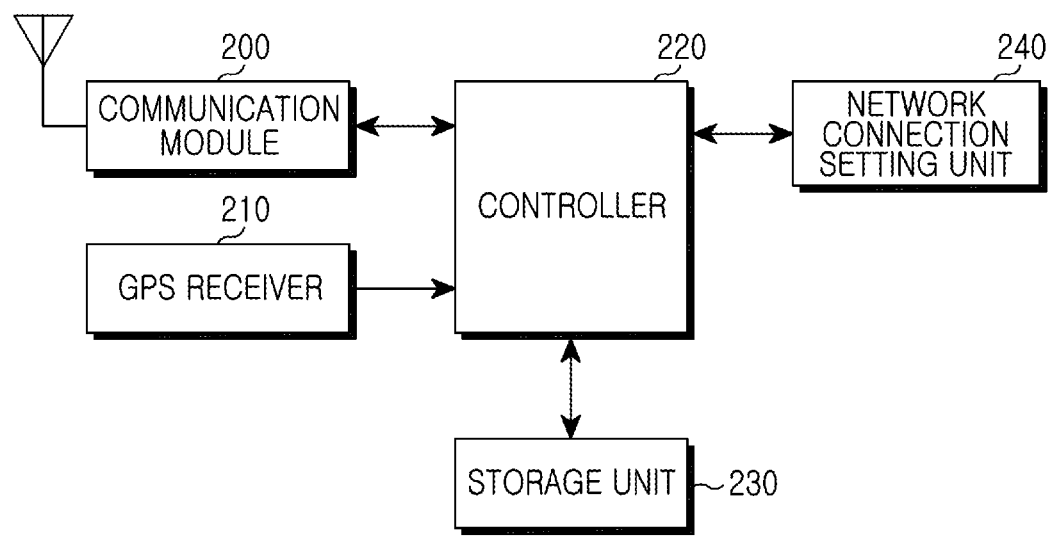
FIG. 2 is a block diagram illustrating a mobile communication terminal according to an exemplary embodiment of the present invention.

FIG. 2 is a block diagram illustrating a mobile communication terminal according to an exemplary embodiment of the present invention. Referring to FIG. 2, the terminal includes a communication module 200, a GPS receiver 210, a controller 220, a storage unit 230, and a network connection setting unit 240. The terminal 100 may include additional units, and the functionality of one or more of the above units may be integrated into a single component.

The communication module 200 performs a function for transmitting and receiving a radio signal of data that is input and output through an antenna. For example, under the control of the controller 220, the communication module 200 converts Transmit (Tx) data into a Radio Frequency (RF) signal by coding the Tx data and then transmits the RF signal through the antenna. Further, the communication module 200 converts the RF signal received through the antenna into a baseband signal, decodes the baseband signal, and provides the decoded baseband signal to the controller 220. The GPS receiver 210 receives a radio wave output from the GPS satellite and acquires location information of the terminal under the control of the controller 220.

The controller 220 controls and processes an overall operation of the terminal. These operations may include functions for voice call and data communication, acquiring network information based on a location of the terminal according to the present invention, and controlling and processing functions for automatically changing a network based on the location by using the acquired network information. The controller 220 determines whether to change the network using location information of the terminal or strength of a signal received from the network currently accessed by the terminal. If it is determined that the network should be changed, the controller 220 transmits the terminal's location information acquired using the GPS receiver 210 to a network information providing server to control and process a function for requesting provision of network information. If the location information changes due to movement of the terminal or if the strength of the signal received from the network currently accessed by the terminal is less than or equal to a threshold, the controller 220 requests the network information providing server to provide network information provided in a region where the terminal is located.

Thereafter, the controller 220 compares the network information received from the network information providing server via the communication module 200 with information on a previously connected network. If the received network information is not the same as the previously connected network information, the controller 220 controls and processes a function for re-setting network connection information. In this case, the controller 220 outputs the received network information to the network connection setting unit 240. The network information may include a cell identifier, a network identifier, a platform identifier, a bootstrap Internet Protocol (IP), a frequency band, a Digital Video Broadcasting-Handheld (DVB-H) network type, an encryption mechanism, etc. The DVB-H network type indicates whether a network type supported by a corresponding network is a Convergence of Broadcasting and Mobile Service (CBMS) or a mobile BroadCAST (BCAST). The encryption mechanism indicates a mechanism of encrypting a signal received from the network. Examples of the encryption mechanism include Digital Rights Management (DRM), a Conditional Access System (CAS), a Service and Content Protection (SCP), etc.

The storage unit 230 includes a Read Only Memory (ROM), a Random Access Memory (RAM), and a flash ROM. The storage unit 230 stores a program for executing the overall operation of the terminal and a variety of data.

When the network information is provided from the controller 220, the network connection setting unit 240 analyzes the provided network information and sets the network information as network connection information of the terminal. The network connection setting unit 240 receives network connection information (e.g., the cell identifier, the network identifier, the platform identifier, the bootstrap IP, the frequency band, the DVB-H network type, the encryption mechanism, etc.) provided in the region where the terminal is located, and sets each of information values as the network connection information of the terminal.

Figure 3:
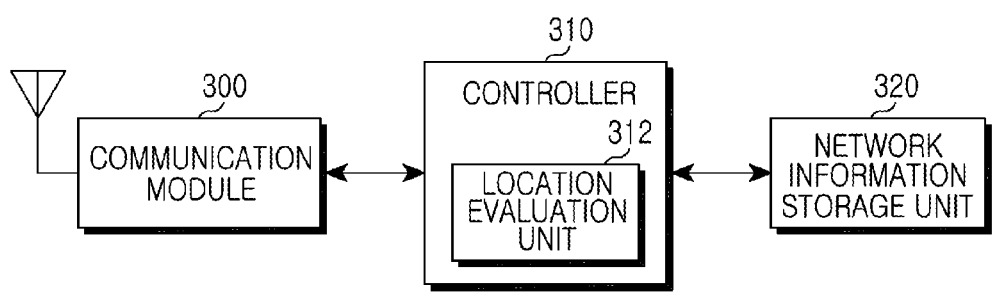
FIG. 3 is a block diagram illustrating a network information providing server according to an exemplary embodiment of the present invention.

FIG. 3 is a block diagram illustrating a network information providing server according to an exemplary embodiment of the present invention. Referring to FIG. 3, the server includes a communication module 300, a controller 310, and a network information storage unit 320.

The communication module 300 performs a function for transmitting and receiving a radio signal of data that is input and output through an antenna. For example, under the control of the controller 310, the communication module 300 converts Tx data into an RF signal by coding the Tx data and then transmits the RF signal through the antenna. Further, the communication module 300 converts the RF signal received through the antenna into a baseband signal, decodes the baseband signal, and provides the decoded baseband signal to the controller 310.

The controller 310 controls and processes an overall operation of the terminal. The controller 310 includes a location evaluation unit 312 to control and process a function for evaluating a network based on a location of the terminal using the network information storage unit 320 and for searching for information on the network to transmit the information to the terminal when network information transmission is requested from the terminal. The network information storage unit 320 stores information of each of networks provided in all regions.

Figure 4:
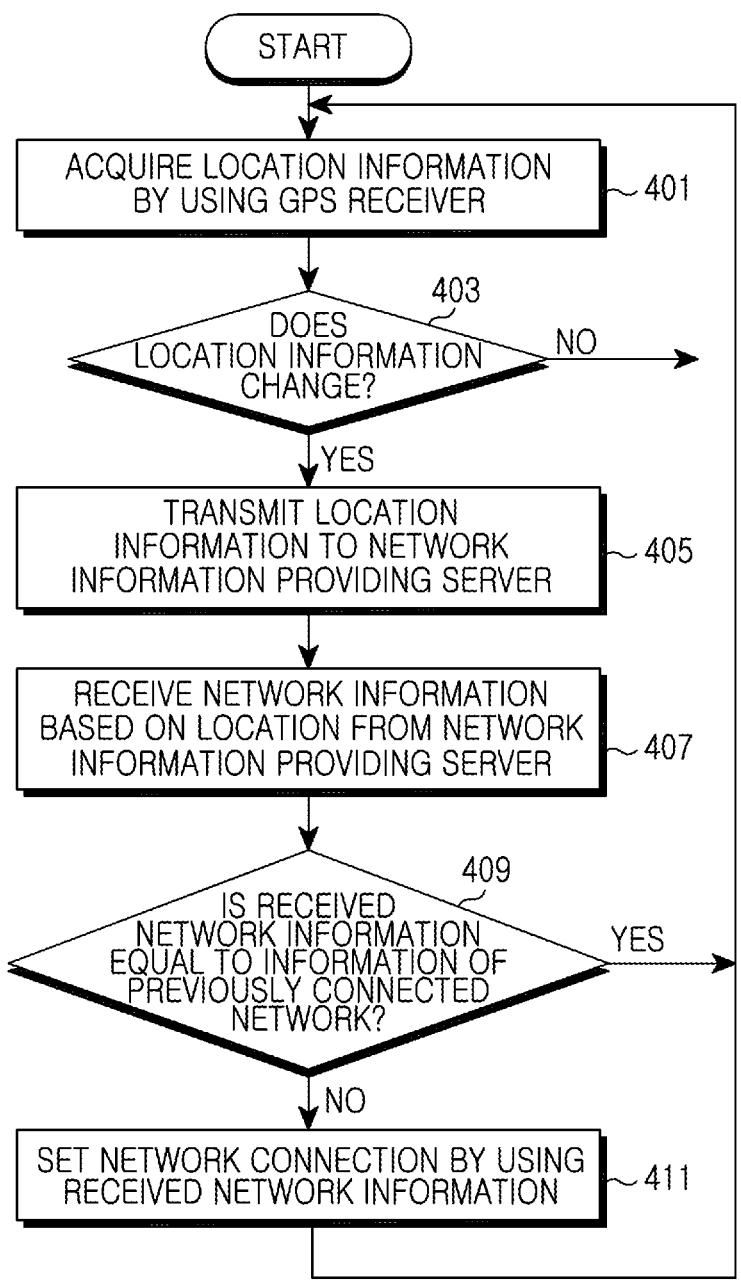
FIG. 4 is a flowchart illustrating a process of setting network information based on a location in a mobile communication terminal according to an exemplary embodiment of the present invention.

FIG. 4 is a flowchart illustrating a process of setting network information based on a location in a mobile communication terminal according to an exemplary embodiment of the present invention. Referring to FIG. 4, the terminal acquires its location information via a GPS receiver in step 401, and in step 403, compares the acquired location information with previously acquired location information to determine whether a location of the terminal has changed.

If it is determined that the location of the terminal has not changed, the process returns to step 401, and the subsequent steps are repeated. In this case, by comparing the acquired location information with the previously acquired location information, the terminal may determine that the location of the terminal changes when the acquired network information and the previously acquired network information are different from each other, or may determine that the location of the terminal changes when the result of the comparison is more than a pre-set threshold. Even if the currently acquired location information is different from the previously acquired location information, the terminal may determine that the location of the terminal does not change if the difference is less than the pre-set threshold.

If it is determined that the location of the terminal has changed, the terminal transmits the acquired location information to a network information providing server to request provision of network information in step 405. In step 407, the terminal receives network information based on the location information from the network information providing server. In step 409, the terminal compares the received network information with information on a previously connected network. If the received network information is equal to the information of the previously connected network, the procedure returns to step 401.

Otherwise, if the received network information is different from the information on the previously connected network, then in step 411 the terminal sets the received network information as network connection information of the terminal and then performs a process of using a corresponding network. Thereafter, returning to step 401, the subsequent steps are repeated.

Figure 5:
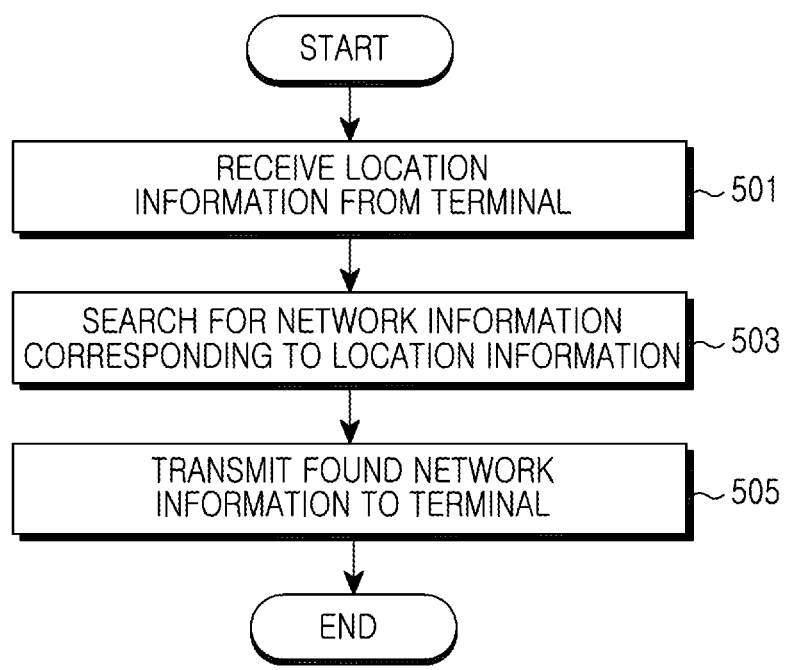
FIG. 5 is a flowchart illustrating a process of providing network information based on a location by a network information providing server according to an exemplary embodiment of the present invention.

FIG. 5 is a flowchart illustrating a process of providing network information based on a location by a network information providing server according to an exemplary embodiment of the present invention. Referring to FIG. 5, the server receives location information from a terminal in step 501, and searches for network information corresponding to the received location information by using a pre-stored database for network information based on a location in step 503. Examples of the network information include a cell identifier, a network identifier, a platform identifier, a bootstrap IP, a frequency band, a DVB-H network type, an encryption mechanism, etc. In step 505, the server transmits the found network information to the terminal.

According to exemplary embodiments of the present invention, a mobile communication terminal acquires location information, and a network corresponding to a location of the terminal is automatically connected by acquiring and setting network information based on location information received from a server. Therefore, when a user moves to a region for receiving a network service of another service provider, a network of that region is automatically connected and thus a roaming service is possible between service providers. In addition, there is no need to use a different DVB-H terminal for each region.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of automatically changing a network in a mobile communication terminal, the method comprising:
   determining whether the network needs to change by acquiring location information of the terminal;
   when it is determined that the network needs to change, transmitting the location information of the terminal to a server;
   receiving network information based on the location information from the server; and
   setting network connection information of the terminal based on the received network information,
   wherein the determining of whether the network needs to change comprises:
   comparing a strength of a signal received from the network currently accessed by the terminal with a threshold; and
   determining that the network needs to change if the signal strength is less than the threshold, and determining that the network does not need to change if the signal strength is greater than or equal to the threshold.

2. The method of claim 1, wherein the determining of whether the network needs to change comprises:
   periodically acquiring the location information of the terminal;
   determining whether the location of the terminal has changed, based on the acquired location information; and
   determining that the network needs to change if the location of the terminal has changed, and determining that the network does not need to change if the location of the terminal has not changed.

3. The method of claim 1, wherein the location information is acquired via any one of a radio wave arrival time difference, power of the terminal, a radio wave reception angle of the antenna, and a mechanism using Global Positioning System (GPS) satellite.

4. The method of claim 1, wherein the network information comprises at least one of a cell identifier, a network identifier, a platform identifier, a bootstrap Internet Protocol (IP), a frequency band, a Digital Video Broadcasting-Handheld (DVB-H) network type, and an encryption mechanism.

5. The method of claim 1, further comprising:
comparing the received network information with information of the network currently accessed by the terminal; and
if the comparison result shows that the received network information differs from the information of the network currently accessed by the terminal, setting network connection information of the terminal based on the received network information.

6. A method of operating a server for automatically changing a network of a mobile communication terminal, the method comprising:
receiving location information of the terminal;
searching for network information corresponding to the location information of the terminal from a pre-stored database;
transmitting the found network information to the terminal; and
when it is determined that a network needs to change, transmitting the location information of the terminal to a server,
wherein it is determined that the network needs to change by comparing a strength of a signal received from the network currently accessed by the terminal with a threshold, determining that the network needs to change if the signal strength is less than the threshold, and determining that the network does not need to change if the signal strength is greater than or equal to the threshold.

7. The method of claim 6, wherein the network information comprises at least one of a cell identifier, a network identifier, a platform identifier, a bootstrap Internet Protocol (IP), a frequency band, a Digital Video Broadcasting-Handheld (DVB-H) network type, and an encryption mechanism.

8. An apparatus for automatically changing a network in a mobile communication terminal, the apparatus comprising:
a location information acquisition unit for acquiring location information of the terminal;
a controller for determining whether the network needs to change by acquiring the location information of the terminal, and when the controller determines that the network needs to change, for transmitting the location information of the terminal to a server to receive network information based on the location information from the server; and
a network connection setting unit for setting network connection information of the terminal based on the received network information,
wherein the controller compares a strength of a signal received from the network currently accessed by the terminal with a threshold, determines that the network needs to change if the signal strength is less than the threshold, and determines that the network does not need to change if the signal strength is greater than or equal to the threshold.

9. The apparatus of claim 8, wherein the controller determines whether a location of the terminal has changed by periodically acquiring the location information of the terminal, and determines that the network needs to change if the location of the terminal has changed, and determines that the network does not need to change if the location of the terminal has not changed.

10. The apparatus of claim 8, wherein the location information acquisition unit acquires the location information via any one of a radio wave arrival time difference, power of the terminal, a radio wave reception angle of the antenna, and a mechanism using Global Positioning System (GPS) satellite.

11. The apparatus of claim 8, wherein the network information comprises at least one of a cell identifier, a network identifier, a platform identifier, a bootstrap Internet Protocol (IP), a frequency band, a Digital Video Broadcasting-Handheld (DVB-H) network type, and an encryption mechanism.

12. The apparatus of claim 8, wherein the controller compares the received network information with information of the network currently accessed by the terminal, and if the comparison result shows that the received network information is different from the information of the network currently accessed by the terminal, sets network connection information of the terminal based on the received network information.

13. A server apparatus for automatically changing a network of a mobile communication terminal, the apparatus comprising:
a storage unit for storing network information based on a location; and
a controller for providing control such that network information corresponding to location information of the terminal is searched for from the storage unit and is then transmitted to the terminal, upon receiving the location information from the terminal,
wherein, when the controller determines that a network needs to change, transmitting the location information of the terminal to a server,
wherein the controller determines that the network needs to change by comparing a strength of a signal received from the network currently accessed by the terminal with a threshold, determines that the network needs to change if the signal strength is less than the threshold, and determines that the network does not need to change if the signal strength is greater than or equal to the threshold.

14. The apparatus of claim 13, wherein the network information comprises at least one of a cell identifier, a network identifier, a platform identifier, a bootstrap Internet Protocol (IP), a frequency band, a Digital Video Broadcasting-Handheld (DVB-H) network type, and an encryption mechanism.

15. A terminal device, comprising:
a GPS receiver for receiving a GPS signal;
a communication unit for transmitting information to, and receiving information from, a server;
a storage unit for storing previously determined location information of the terminal device; and
a controller for determining a current location of the terminal device based on the GPS signal, for determining whether to change a current network of the terminal device based on the current location of the terminal device, and for changing to a new network based on acquired network information received from the server,
wherein, when the controller determines that the current network should be changed, the controller transmits information on the current network to the server via the communication unit and receives the acquired network information from the server in response,
wherein the controller periodically determines the current location of the terminal device, compares the current location with the previously determined location stored in the storage unit, determines that the network should be changed when the current location differs from the previously determined location by more than a predetermined amount, and stores the current location in the storage unit, and
wherein, when the current location differs from the previously determined location by more than the predetermined amount, the controller determines that the network should be changed only if a signal strength of the current network is less than a predetermined threshold.

* * * * *